Patented Feb. 14, 1939

2,146,725

UNITED STATES PATENT OFFICE 2,146,725

PROCESS OF PREPARING HALOGENATED ACYCLIC HYDROCARBONS CONTAINING FLUORINE

Raymond A. Dunphy, Penns Grove, N. J., assignor to Kinetic Chemicals, Inc., Wilmington, Del., a corporation of Delaware No Drawing. Application September 11, 1935, Serial No. 40,156. In Great Britain June 14, 1935

7 Claims. (Cl. 260—653)

This invention relates to a process of preparing organic fluorine compounds, more particularly halogenated acyclic hydrocarbons containing fluorine.

It is known that fluorinated acyclic hydrocarbons and aryl derivatives thereof can be obtained by reacting hydrogen fluoride and halogenated hydrocarbons containing halogen other than fluorine attached to one or more acyclic carbon atoms in the presence of antimony halides, such as mixtures of pentavalent and trivalent antimony halides.

One such process is described in U. S. Patent No. 2,005,708 to H. W. Daudt and M. A. Youker issued June 18, 1935. According to one modification of this process, highly fluorinated aliphatic hydrocarbon compounds may be prepared by passing hydrogen fluoride and a halogenated acyclic hydrocarbon containing a halogen other than fluorine through a series of antimony halide catalysts consisting of a mixture of antimony halides in tri- and pentavalent form, the fluorine content of each catalyst being successively lower. In the example given, the compositions of the successive catalysts with respect to tri- and pentavalent antimony are approximately the same. A free halogen such as chlorine is preferably added to facilitate the reaction and maintain the pentavalent antimony content.

It is an object of the present invention to provide an improved process for preparing fluorinated aliphatic hydrocarbon compounds of the type described. A further object is to provide a process for producing highly fluorinated aliphatic hydrocarbon compounds by a reaction between hydrogen fluoride and a halogenated acyclic hydrocarbon containing a halogen other than fluorine, with or without the addition of a free halogen such as chlorine, in which the utilization of hydrogen fluoride is greatly increased. A still further object is the provision of a process of the type previously described in which the utilization of chlorine is improved and which avoids the presence of substantial amounts of chlorine in the final product and thereby simplifies recovery of said product. Other objects will appear hereinafter.

In accomplishing these objects according to the present invention, it has been found that the reaction proceeds smoothly and with relatively high yields, particularly of the higher fluorinated hydrocarbons which are more difficult to produce, by passing the hydrogen fluoride and halogenated acyclic hydrocarbon containing a halogen other than fluorine, preferably with the addition of a free halogen such as chlorine, through a series of catalysts consisting essentially of mixtures of tri- and pentavalent antimony halides, in which succeeding catalysts not only have a successively lower fluorine content but are successively higher in trivalent antimony. In order to produce higher fluorinated aliphatic hydrocarbons, such as, for example, tetrafluorodichloroethane, it is preferable to carry out the reaction by maintaining the catalysts at a temperature from about 125° C. to about 200° C. and under super-atmospheric pressures of about 25 to 150 pounds per square inch.

In practicing the invention, for example, two catalysts may be employed consisting of mixtures of tri- and pentavalent antimony halides containing chemically combined fluorine, in which catalyst #1 contains 3 to 10% trivalent antimony and 10 to 21% fluorine and catalyst #2 contains 10 to 40% trivalent antimony and 6 to 10% fluorine. The temperature of each catalyst is maintained at 125°–175° C., preferably within the range 140°–170° C., and under a pressure of 50 to 150 pounds per square inch (gauge), preferably 75–100 pounds per square inch (gauge).

The operation may be illustrated with reference to the production of fluorochloroethanes, as, for instance, tetrafluorodichloroethane from chloroethanes or ethylenes (e. g., polychloroethanes or ethylenes such as perchloroethylene, hexachloroethane, partially fluorinated derivatives thereof, and/or mixtures containing said compounds), as follows:

With the catalyst at proper temperature, the organic compound to be fluorinated (that is, perchloroethylene or mixtures of perchloroethylene with hexachloroethane or partially fluorinated hexachloroethane, or both) are fed to the first catalyst. The catalyst reacts with the organic material, converting the perchloroethylene into hexachloroethane and fluorinated derivatives of hexachloroethane, resulting in an increase in the trivalent antimony content and a decrease in the fluorine content of the catalyst. These two changes are corrected by the addition of both chlorine and hydrogen fluoride which reduce the trivalent antimony content and increase the fluorine content to its previous value.

The feeding of chlorine and hydrogen fluoride is preferably effected concurrently with the introduction of the organic material to be fluorinated. Thus, the first catalyst is always maintained at the desired composition.

The gases issuing from the first catalyst contain, in addition to organic fluorochlorides, hydrochloric acid, hydrofluoric acid and chlorine. The latter two are present because of the incompleteness of their reaction with the catalyst.

This mixture of gases now passes to the second catalyst where the fluorine content is maintained lower than in the first catalyst and the trivalent antimony content is higher, resulting in additional reaction between the hydrofluoric acid and chlorine with the catalyst and preventing passage of these reactants into the scrubbers and condensers. The absorption of chlorine in the second catalyst tends to lower the trivalent antimony content, but this is preferably prevented by the addition of perchloroethylene directly to this catalyst. The added perchloroethylene then reacts, forming fluorochloroethanes and thereby prevents the absorption of hydrofluoric acid from raising the fluorine content of the catalyst.

The chlorine absorption is better the higher the trivalent antimony content, and similarly the hydrogen fluoride absorption is more complete the lower the fluorine content of this catalyst.

Lower fluorinated ethanes, such as $C_2FCl_5$, $C_2F_2Cl_4$, and $C_2F_3Cl_3$, can be made under the conditions indicated for catalyst #2, making it possible to utilize the chlorine and fluorine in said catalyst for the production of these organic intermediates of $C_2F_4Cl_2$ which itself is largely formed by the more vigorous conditions described for the first catalyst.

These lower fluorinated ethanes can be recycled to the first of the series of catalysts and further fluorinated.

The reaction gases are passed through water scrubbers, alkali scrubbers and acid scrubbers and condensed as in the previously described processes.

The invention will be further understood, particularly as regards proportions of materials, temperatures and pressures, from a consideration of the following example, in which the parts are by weight.

*Example*

Two steam jacketed catalyst vessels were equipped with standpipes for introducing hydrofluoric acid, chlorine and organic halides. An outlet was placed on the first pot leading to a reflux condenser and then to a standpipe in the second catalyst vessel. The outlet from the second catalyst vessel was also connected to a reflux condenser, a relief valve and then to scrubbers for removal of acid gases and condensers for collection of the organic reaction products. Catalyst vessel #1 was charged with 5000 parts of an antimony halide mixture containing about 6% trivalent antimony and about 16% fluorine. Catalyst vessel #2 was charged with 5000 parts of an antimony halide mixture containing about 40% trivalent antimony and about 8% fluorine.

The catalyst vessels were heated until the temperature was 160°–165° C. The raw material was then continuously fed at about the following rates:

|  | Catalyst #1 | Catalyst #2 |
|---|---|---|
|  | Parts per day | Parts per day |
| $C_2Cl_4$ | 900 | 350 |
| $C_2Cl_3F_3$ | 2100 | 150 |
| HF | 900 | None |
| Chlorine | 535 | None |

The pressure in the two catalysts was allowed to rise to 7.5 atmospheres and maintained at this point by release of products to the scrubbers through the relief valve.

The feeds mentioned above maintained the compositions of the catalyst about as indicated, any deviation detected by analyses being corrected by a change in the feeds; that is, if the trivalent antimony rises, the perchloroethylene feed is raised. Similarly, a reduction in fluorine content is corrected by increased hydrogen fluoride feed or reduced organic halide feed. The efficiency of chlorine absorption is almost quantitative under these conditions and the hydrogen fluoride absorption is about 75%. The crude product obtained contains approximately equal quantities of trifluorotrichloroethane and tetrafluorodichloroethane, which are subsequently separated by fractionation and the former returned to the process.

It will be apparent that this process, while particularly adapted to the preparation of higher fluorinated aliphatic hydrocarbons, may be employed generally in processes involving the reaction of hydrogen fluoride with halogenated aliphatic hydrocarbons, as described, for instance, in U. S. Patents Nos. 2,005,705, 2,005,708, 2,005,710 and 2,005,711.

The composition of the catalyst has been defined by the fluorine content and the trivalent antimony content calculated as antimony metal. The remainder is, of course, made up of pentavalent antimony and halides other than fluorine. The amount of pentavalent antimony present in a mixture of tri- and pentavalent antimony halides can be calculated from the fluorine and trivalent antimony content.

The products find application for various commercial purposes. Thus, tetrafluorodichloroethane possesses especially desirable properties for use as a refrigerant. Some of the higher boiling compounds such as trifluorotrichloroethane are generally applicable for use as solvents or reaction media.

The process possesses many advantages of a practical and economical nature. It is characterized by ease of control and smoothness of operation and provides a means of producing highly fluorinated acyclic hydrocarbons on a commercial scale. The efficiency of hydrogen fluoride absorption is almost double. The passage of chlorine into the water scrubbers is prevented. This is of considerable advantage because the chlorine is not easily scrubbed from the products, resulting in its appearance together with a slight amount of acids in the product. Its removal from the product is difficult without neutralization by a base, as for example, ammonia (see U. S. Patent No. 1,946,199). While the use of ammonia to neutralize the acid is very desirable, the presence of chlorine introduces a serious hazard due to the formation of explosive nitrogen chlorides. The presence of free chlorine in the product also greatly increases the corrosion of equipment and attending losses.

As many apparently widely different embodiments of this invention may be made without departing from the spirit and scope thereof, it is to be understood that I do not limit myself to the specific embodiments thereof except as defined in the following claims.

I claim:

1. In a process of producing organic fluorine compounds, the step which comprises passing hydrogen fluoride and a halogenated acyclic hydrocarbon containing at least one halogen atom other than fluorine through a series of antimony halide catalysts consisting essentially of trivalent and pentavalent antimony halides, in which the first catalyst is relatively high in pentavalent antimony and has a relatively high fluorine content, and succeeding catalysts have a relatively lower fluorine content than the first catalyst and a relatively higher trivalent antimony content.

2. In a process of producing halogenated acyclic hydrocarbons containing fluorine, the step which comprises passing hydrogen fluoride, chlorine and a halogenated acyclic hydrocarbon containing chlorine through a series of mixed antimony fluorochlorides containing antimony in both the tri- and pentavalent states, in which the first antimony fluorochloride mixture is relatively high in pentavalent antimony and has a relatively high fluorine content and succeeding mixtures have a lower fluorine content and are higher in trivalent antimony.

3. In a process of producing halogenated ethanes containing fluorine, the step which comprises passing hydrogen fluoride, chlorine and a poly-chloroethane through a series of mixed antimony fluorochlorides containing antimony in both the tri- and pentavalent states, in which the first antimony fluorochloride mixture is relatively high in pentavalent antimony and has a relatively high fluorine content and succeeding mixtures have a lower fluorine content and are higher in trivalent antimony.

4. In a process of producing halogenated ethanes containing fluorine, the step which comprises passing hydrogen fluoride, chlorine, and perchloroethylene through a series of mixed antimony fluorochlorides containing antimony in both the tri- and pentavalent state, in which the first antimony fluorochloride mixture is relatively high in pentavalent antimony and has a relatively high fluorine content and succeeding mixtures have a lower fluorine content and are higher in trivalent antimony.

5. The process of producing highly halogenated ethanes containing fluorine which comprises passing hydrogen fluoride, chlorine and a poly-chlorohydrocarbon containing two carbon atoms into a series of catalysts consisting essentially of antimony fluorochlorides containing both tri- and pentavalent antimony, in which the fluorine content of the first catalyst is within the range from about 10% to about 21% and the trivalent antimony content is within the range of about 3% to about 10%, and the fluorine content of the second catalyst is lower than that of the first catalyst and within the range of about 6% to about 10% and the trivalent antimony content is higher than that of the first catalyst and within the range of about 10% to about 40%, and effecting reaction at temperatures within the range of about 125° to about 175° C. under superatmospheric pressures of about 50 to about 150 pounds per square inch.

6. The process of producing highly halogenated ethanes containing fluorine which comprises passing hydrogen fluoride, chlorine and a polychlorohydrocarbon containing two carbon atoms into a series of catalysts consisting essentially of antimony fluorochlorides containing both tri- and pentavalent antimony, in which the fluorine content of the first catalyst is within the range from about 10% to about 21% and the trivalent antimony content is within the range of about 3% to about 10%, and the fluorine content of the second catalyst is lower than that of the first catalyst and within the range of about 6% to about 10% and the trivalent antimony content is higher than that of the first catalyst and within the range of about 10% to about 40%, and effecting the reaction at temperatures within the range of about 140° to about 170° C. under superatmospheric pressures of about 75 to about 100 pounds per square inch.

7. The process of producing tetrafluorodichloroethane which comprises passing hydrogen fluoride, chlorine and perchloroethylene into a series of catalysts consisting essentially of antimony fluorochlorides containing both tri- and pentavalent antimony, in which the fluorine content of the first catalyst is within the range from about 10% to about 21% and the trivalent antimony content is within the range of about 3% to about 10%, and the fluorine content of the second catalyst is lower than that of the first catalyst and within the range of about 6% to about 10% and the trivalent antimony content is higher than that of the first catalyst and within the range of about 10% to about 40%, and effecting the reaction at temperatures within the range of about 140° to about 170° C. under superatmospheric pressures of about 75 to about 100 pounds per square inch.

RAYMOND A. DUNPHY.